US007484206B2

(12) United States Patent  (10) Patent No.: US 7,484,206 B2
Drouet et al.  (45) Date of Patent: Jan. 27, 2009

(54) SYNCHRONIZATION OF PASSWORD AND USER DATA DURING MIGRATION FROM A FIRST OPERATING SYSTEM PLATFORM TO A SECOND OPERATING SYSTEM PLATFORM

(75) Inventors: Nicholas Drouet, Worchester Park (GB); Julius E. Enarusai, Burlington, NJ (US); James Kevin McDonough, Scarborough, ME (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 11/034,271

(22) Filed: Jan. 12, 2005

(65) Prior Publication Data

US 2006/0155773 A1  Jul. 13, 2006

(51) Int. Cl.
*G06F 9/45* (2006.01)
(52) U.S. Cl. ..................................... 717/169
(58) Field of Classification Search .................. 717/169
See application file for complete search history.

(56) References Cited

U.S. PATENT DOCUMENTS 5,623,663 A  4/1997 Morgan et al.
6,889,376 B1 * 5/2005 Barritz et al. ............... 717/175
7,055,042 B1 * 5/2006 Gough et al. .................. 726/19
7,210,131 B2 * 4/2007 Schmidt et al. ............. 717/137
7,251,732 B2 * 7/2007 Jamieson et al. ............ 713/182
7,337,197 B2 * 2/2008 Wilson et al. ............... 707/204
2004/0081320 A1 * 4/2004 Jordan et al. ................ 380/247
2004/0142711 A1 * 7/2004 Mahonen et al. ............ 455/502
2004/0260953 A1 * 12/2004 Jamieson et al. ............ 713/202
2005/0193032 A1 * 9/2005 Barritz et al. ............... 707/200
2006/0080729 A1 * 4/2006 Koh et al. ...................... 726/5

* cited by examiner

*Primary Examiner*—John Chavis
(74) *Attorney, Agent, or Firm*—Dillon & Yudell LLP

(57) ABSTRACT

A method and system that enables efficient migration of security and other user data from one operating system environment to another in a large distributed authentication environment by keeping all critical data in sync between the two operating system environments. Specifically, synchronization of password and user data can be achieved during migration of password data from a first operating system platform to a database of a second operating system platform over a prolonged period of time without disruption of service, while allowing the users to (1) continue accessing the system resources, such as print and file services during the migration and (2) change/update passwords and other profile information.

1 Claim, 4 Drawing Sheets

SYNCHRONIZATION OF PASSWORD AND USER DATA DURING MIGRATION FROM A FIRST OPERATING SYSTEM PLATFORM TO A SECOND OPERATING SYSTEM PLATFORM

BACKGROUND OF THE INVENTION

1. Technical Field

The present invention relates generally to computer systems, and in particular to sharing data between computer systems. Still more particularly, the present invention relates to sharing data between computer systems with incompatible operating systems (OS).

2. Description of the Related Art

Operation of computer systems requires an operating system (OS). There are presently several different OSes available on the market. Each OSes provided unique features, and consequently, it is very common for the OSes to be incompatible with each other. Customers typically chose one of the available OSes to run their computer system(s).

Occasionally, these customers may decide to change their current operating system platform to another operating system platform. Typically, when changing operating system platforms, the customers desire to migrate their print and file services. The migration of print and file services from one operating system platform to another is fairly simple and straight forward for small deployments (single computers or small network of computers). With smaller systems, the migration process can be completed very quickly, causing little delay in allowing the users to access the new operating system platform and sign in to interact with the services provided.

With larger distributed systems (e.g., systems with multiple domain controllers), however, the migration process becomes very complicated and may take significantly longer (perhaps months) to be completed. More specifically, the logistics of keeping the user data in synch across multiple domains during the migration becomes extremely difficult.

The domain controllers usually provide the authentication features for users who desire to access the services provided by a particular platform. Shutting down user access to the domain controllers of the old platform while the new platform is being made ready for user access is typically not an attractive option. With the conventional method, the users are shut out and cannot update their password or other user data while the migration process is being undertaken. There is therefore a need to enable migration across different operating system platforms to occur in a relatively seamless manner from the user's perspective.

SUMMARY OF THE INVENTION

Disclosed is a method and system for efficiently migrating security and other user data from one operating system platform/server to another. Specifically, synchronization of password and user data is achieved during migration of password data from a first operating system platform in a distributed authentication environment to a database of a second operating system platform. The user is still provided access to the older platform while migration is being completed, such that the user may be unaware that the migration is occurring.

The synchronization is achieved using a collection of software tools/utilities operating/executing within the source and destination operating system platforms. These software utilities include a directory integrator and a directory server at the target server, and, in the illustrative embodiment, Samba at the destination server. A migration support (MS) utility is also provided to initiate and control the synchronization process from the target server to the database of the destination server.

The combination of the features of the individual software tools along with the newly programmed functions (provided by the MS utility) allows migration services personnel to implement a staged migration of the first operating system platform to a second operating system platform over a period of time, without any visible service disruption to the user. The Directory Integrator (DI) utility is utilized to provide a set of functions, which include password synchronization between multiple systems. DI utility also provides the ability to write custom scripts that collect and store data between various systems. The invention capitalizes on this functionality of the DI, and provides a number of custom scripts packaged as the migration support utility and implemented using the DI utility.

The custom scripts perform a number of functions. Among the various functions provided, two main functions are identified. The first function provides the ability to capture password change requests on the server of the first operating system platform and propagate the new changes to a specific Samba data storage facility. In one embodiment, this function is achieved using a Directory Server Password Synchronizer (DSPS) utility. The second function provides the ability to synchronize other user data, including additions and updates, from the first operating system platform to the data storage facility (destination database) of the second operating system platform.

During implementation of the first function, when a password change on a first operating system platform is detected, the new password value is obtained. A search operation is performed on the database of the target system to determine if the entry exists in the destination domain that is specified by the administrator. When the entry exists in the domain, the user's password and database-specific password fields (i.e., specific fields maintained in the target database and used by the destination database to authenticate users) are forwarded to the destination domain and the entry within the destination database is updated with the new password.

In one embodiment, a timer is established to poll the first operating system platform for additions and updates to the user database at the first platform and trigger dynamic propagation of the additions and updates to the destination server at pre-set periods. Also, in one embodiment, all the fields needed by the destination database for domain security are updated.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
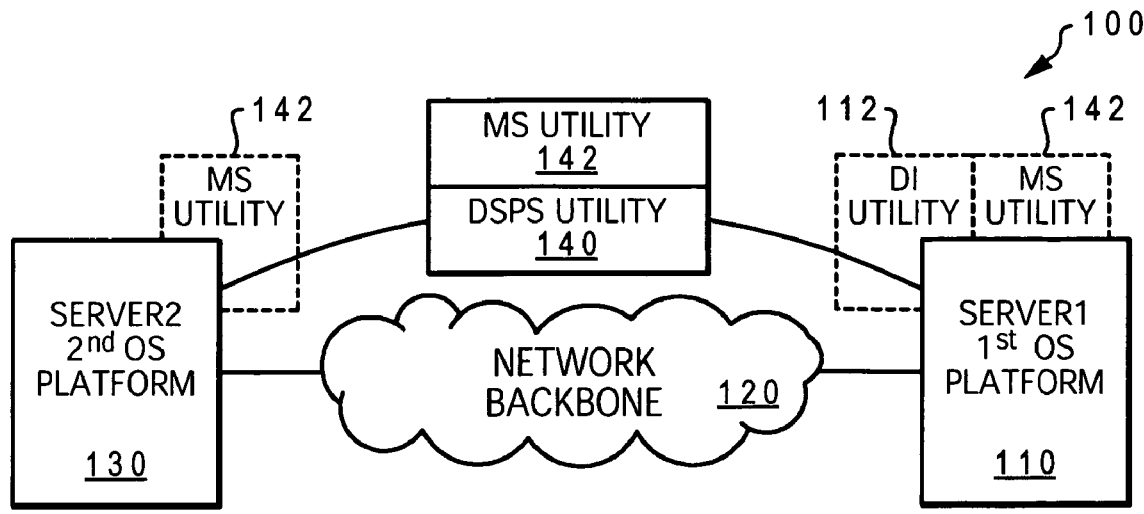
FIG. 1 illustrates an exemplary network having both a first operating system platform/server and a second operating system platform/server within which key features of the invention may advantageously be implemented, according to one embodiment.

The present invention provides a method and system for efficiently migrating security and other user data from one operating system platform/server to another. Specifically, synchronization of password and user data is achieved during migration of password data from a first operating system platform in a distributed authentication environment to a database of a second operating system platform. The user is still provided access to the older platform while migration is being completed, such that the user may be unaware that the migration is occurring.

The synchronization is achieved using a collection of software tools/utilities operating/executing within the source and destination operating system platforms. These software utilities include a directory integrator and a directory server at the target server, and, in the illustrative embodiment, Samba at the destination server. A migration support (MS) utility is also provided to initiate and control the synchronization process from the target server to the database of the destination server.

The illustrative embodiment of the invention makes use of the functionality of Samba to provide the authentication features provided by an operating system. Samba is a software tool that may be run on several different platforms, including Microsoft's Windows, UNIX, Linux, IBM's System 390, OpenVMS, and other operating systems. Samba uses the TCP/IP protocol that is installed on the host server (i.e., a second server running a second operating system). According to the invention, Samba is configured to allow the host server to interact with a client or first server running a different operating system. More information about Samba may be found at www page "samba.org/samba/samba.html."

In addition to Samba, reference is also made to the Lightweight Directory Access Protocol (LDAP) database. LDAP is a software protocol utilized to generate an LDAP directory structure, which is organized in a simple "tree" hierarchy. LDAP enables efficient location of information, including resources such as files and devices in a network, and an LDAP directory may be distributed among many servers. LDAP servers also provide "authentication" services, so that web, email, and file-sharing servers (for example) can use a single list of authorized users and passwords. In the illustrative embodiment, each target server within the first operating system platform/network operates with a replicated version of the total LDAP directory that is synchronized periodically.

The combination of the features of the individual software tools along with the newly programmed functions (provided by the MS utility) allows migration services personnel to implement a staged migration of the first operating system platform to a second operating system platform over a period of time, without any visible service disruption to the user. The Directory Integrator (DI) utility is utilized to provide a set of functions, which include password synchronization between multiple systems. DI utility also provides the ability to write custom scripts that collect and store data between various systems. The invention capitalizes on this functionality of the DI, and provides a number of custom scripts packaged as the migration support utility and implemented using the DI utility.

The custom scripts perform a number of functions. Among the various functions provided, two main functions are identified. The first function provides the ability to capture password change requests on the server of the first operating system platform and propagate the new changes to a specific Samba data storage facility. In one embodiment, this function is achieved using a Directory Server Password Synchronizer (DSPS) utility. The second function provides the ability to synchronize other user data, including additions and updates, from the first operating system platform to the Samba data storage facility.

During implementation of the first function, when a password change on a first operating system platform is detected, the new password value is obtained. A search operation is performed on the database of the target system (e.g., LDAP) to determine if the entry exists in the domain that is specified by the administrator. When the entry exists in the domain, the user's password and database-specific password fields are forwarded to the domain and the entry within the database is updated with the new password. According to one illustrative embodiment, these password fields are specific fields in the database maintained by LDAP and used by Samba to authenticate users, and include the user's LDAP password and Samba LAN Manager password, respectively.

In one embodiment, a timer is established to poll the first operating system platform for additions and updates to the user database at the first platform and trigger dynamic propagation of the additions and updates to the destination server at pre-set periods. Also, in one embodiment, all the fields needed by the destination database for domain security are updated.

The functional features of the invention may be expanded for use in migrating and synchronizing user accounts from any operating system to any other operating system. The invention may also be implemented in any environment where a decentralized authentication system is being used. That is, any decentralized authentication system may be migrated to across operating system platforms. The authentication system of the first operating system platform may then be kept in "sync" with that of the second operation system platform by implementing the technique provided by the invention over the migration period. This ability to synchronize the authentication system across platforms allows the users to seamlessly access the resources maintained by both systems and also allows the administrator to maintain the users' account information during the migration.

Figure 3:
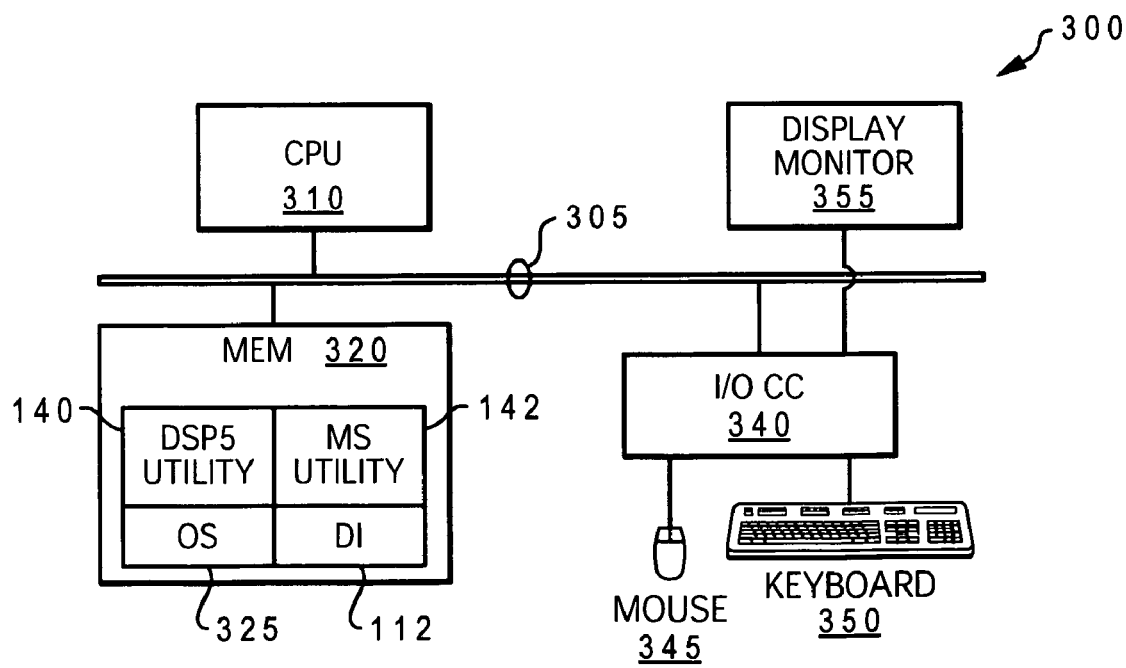
FIG. 3 illustrates an exemplary data processing system, which may be utilized to implement several of the key functional utilities/software features of the present invention.

Several functional features of the invention are described below with reference to specific figures. Where provided, those figures and the specific description thereof are not meant to be limiting on the invention. For example, while FIGS. 1 and 3 provide generalized examples of a network and a data processing system, respectively, it is understood that the specific configuration and complexity of each of figure may range from the basic representation provided herein to a more complex and detailed representation. The features of the invention apply regardless of the specific representation of those components. Also, while the invention is described with reference to specific proprietary software of International Business Machines (IBM) Corporation, it is understood that any software that completes the particular processes described herein, whether proprietary or not falls within the reach of the invention.

With reference now to the figures, and in particular FIG. 1, there is illustrated an exemplary network system comprising a destination server/platform and an origination/target server/platform. Network 100 includes a network backbone 120 to which is connected first server 110, which provides/represents a first operating system platform, and second server 130, which provides/represents a second operating system platform. For simplicity in differentiating servers and associated operating systems, first server 110 and second server 130 are hereinafter referred to as first operating system platform 110 and second operating system platform 130, respectively. Second operating system platform 130 includes a data storage facility (not specifically shown). First operating system platform 110 includes a directory of user information (not shown).

First operating system platform 110 executes several software utilities that complete/facilitate the migration of data/information from first server 110 to second server 130 via network backbone 120. Included within these software utilities are DI utility 112 and MS utility 142. The invention harnesses the functionality of several software tools/utilities (described below) combined within the migration synchronization (MS) utility 142 to enable migration of data and synchronization of passwords and other security data from one operating system platform to another. As is shown by FIG. 1, directory server password/data synchronizer (DSPS) utility 140 and MS utility 142 provides a bridge across network backbone 120 that enables synchronization for password updates entered on the first operating system platform 110 with the database of second operating system platform 130.

While DSPS utility 140 and MS utility 142 are illustrated suspended above the network backbone 120, operation of both utilities occurs within a data processing system similar to that illustrated by FIG. 3. A similarly configured data processing system 300 may perform the functions of first operating system platform 110 and/or second operating system platform 130. However, for clarity, data processing system 300 will be assumed to be synonymous with first operating system platform 110 when carrying out the password capture, domain determining, and password transfer/forwarding features of the invention. When the password receipt and database synchronization features are being described, however, data processing system 300 will be assumed to synonymous with second operating system platform 130.

Data processing system 300 comprises processor 310, memory 320, and input/output (I/O) controller 340, all interconnected via a system bus 305. I/O controller 340 controls the input and output devices of data processing system 300, of which mouse 345, keyboard 350, and display monitor 355 are illustrated.

Located within memory 320 are a number of software programs, including operating system 325, DI utility 112, and DSPS utility 140 and MS utility 142. Operating system 325 is a first or second one of the commercially available operating systems, depending on whether data processing system is the target (old) platform or the destination (new) platform. General functionality of DSPS utility 140 and MS utility 142 are now described.

Among the various functions provided by the DI utility 112, DSPS utility 140, and MS utility 142, two main functions are identified. The first function provides the ability to capture password change requests on the first operating system platform and propagate the changes (or new passwords) to a data storage facility of second operating system platform 130. This function is further illustrated by FIG. 4A, which is described below. In one embodiment, this function is achieved using a DSPS utility 140. The second function provides the ability to synchronize other user data, including additions and updates thereto, from the first operating system platform to the data storage facility of the second operating system platform. The second function is illustrated by FIG. 4B, which is also described below.

During implementation of the first function, when a change of a user password or entry of new user data on the first operating system platform is detected, the new password value (or entry) is obtained. An LDAP search operation is performed on the target system's LDAP directory to determine if the user entry exists in the domain that is specified by the administrator. When the entry exists in the domain, the user password and Samba LAN Manager Password fields of the entry are updated with the new password.

According to one specific embodiment, several of the functions of MS utility are provided by a number of software utilities. In the exemplary embodiments, the software utilities include a directory integrator utility, such as IBM's Directory Integrator and a directory server utility, such as IBM's Directory Server. Directory Integrator (DI) and Directory Server are trademarked by International Business Machines (IBM). A description/definition of the function of each utility as well as the function of other components utilized to complete the invention is now provided.

The directory server is a server with a collection of information about objects arranged in a hierarchical structure. The server provides a specialized database that enables users or applications to find resources that have the characteristics needed for a particular task. A directory can be centralized or distributed. If a directory is centralized, there is one directory server (or a server cluster) at one location that provides access to the directory. If the directory is distributed, more than one server, usually geographically dispersed, provides access to the directory.

The IBM Tivoli Directory implements the Internet Engineering Task Force (IETF) LDAP V3 specifications and includes enhancements added by IBM in functional and performance areas. These enhancements including using IBM DB2® as the backing store to provide (per LDAP operation) transaction integrity, high performance operations, and on-line backup and restore capability. The IBM Tivoli Directory Server interoperates with the LDAP-based clients.

IBM Tivoli Directory Integrator manages the technicalities of connecting to and interacting with the various data sources that are to be integrated, abstracting away the details of their application programming interfaces (APIs), transports, protocols, and formats. Instead of focusing on data, IBM Directory Integrator lifts the view to the information level, allowing for concentration on the transformation, filtering, and other business logic required to perform each exchange.

IBM Directory Integrator enables the building of libraries of components and business logic that can be maintained, extended, and reused to address new challenges. Development projects across an organization may all share IBM Directory Integrator assets, resulting in independent projects (even point solutions) that immediately fit into a coherent integrated infrastructure.

Finally, the IBM Tivoli Directory Integrator provides an infrastructure and a number of ready-to-use components for implementing solutions that synchronize user passwords in heterogeneous software environments. A password synchronization solution built with the IBM Tivoli Directory Integrator is able to intercept password changes on a number of systems. Synchronization is achieved through the IBM Tivoli Directory Integrator Assembly Lines which can be configured to propagate the intercepted passwords to desired systems.

Three layers are provided in the IBM Tivoli Directory Integrator Password Synchronizer architecture:

The first layer is the Target System, which designates the software system where password changes are intercepted. The Password Synchronizer component hooks into the Target System using custom interfaces provided by the Target System and intercepts password changes as they occur in the Target System, before the password is hashed irreversibly.

(2) The second layer is the Password Store, which represents a persistent storage system (for example, an LDAP directory or WebSphere MQ Everyplace) where the intercepted and already-encrypted passwords are stored in a form and location that are accessible from the IBM Tivoli Directory Integrator. The Password Storage may reside on the Target System machine or on another network machine.

(3) The third layer is the Directory Integrator, which uses a connector component to connect to the Password Storage and retrieve the passwords stored there. Once in the IBM Tivoli Directory Integrator, the passwords are decrypted and made available to the AssemblyLine that synchronizes the passwords with other systems. The IBM Tivoli Directory Integrator can be deployed on a machine different than the Target System and Password Storage machines.

With the above proprietary operating systems and software utilities, a specific implementation of the invention may now be described. However, while the invention is described with specific reference to IBM proprietary software, it is understood that these references are not meant to be limiting on the invention. That is, different utilities that perform similar directory and synchronization functions may be utilized in place of the above described list of proprietary software. Also, since the synchronization features of the invention are applicable to migration across different operating systems than those provided herein, a different set of utilities may be required to complete the synchronization and other functions described. Finally, for simplicity in completing the overall synchronization features, the relevant features provided by each software/utility, along with the new features of the invention may be separately packaged as the migration synchronization (MS) utility, as described herein.

Figure 2:
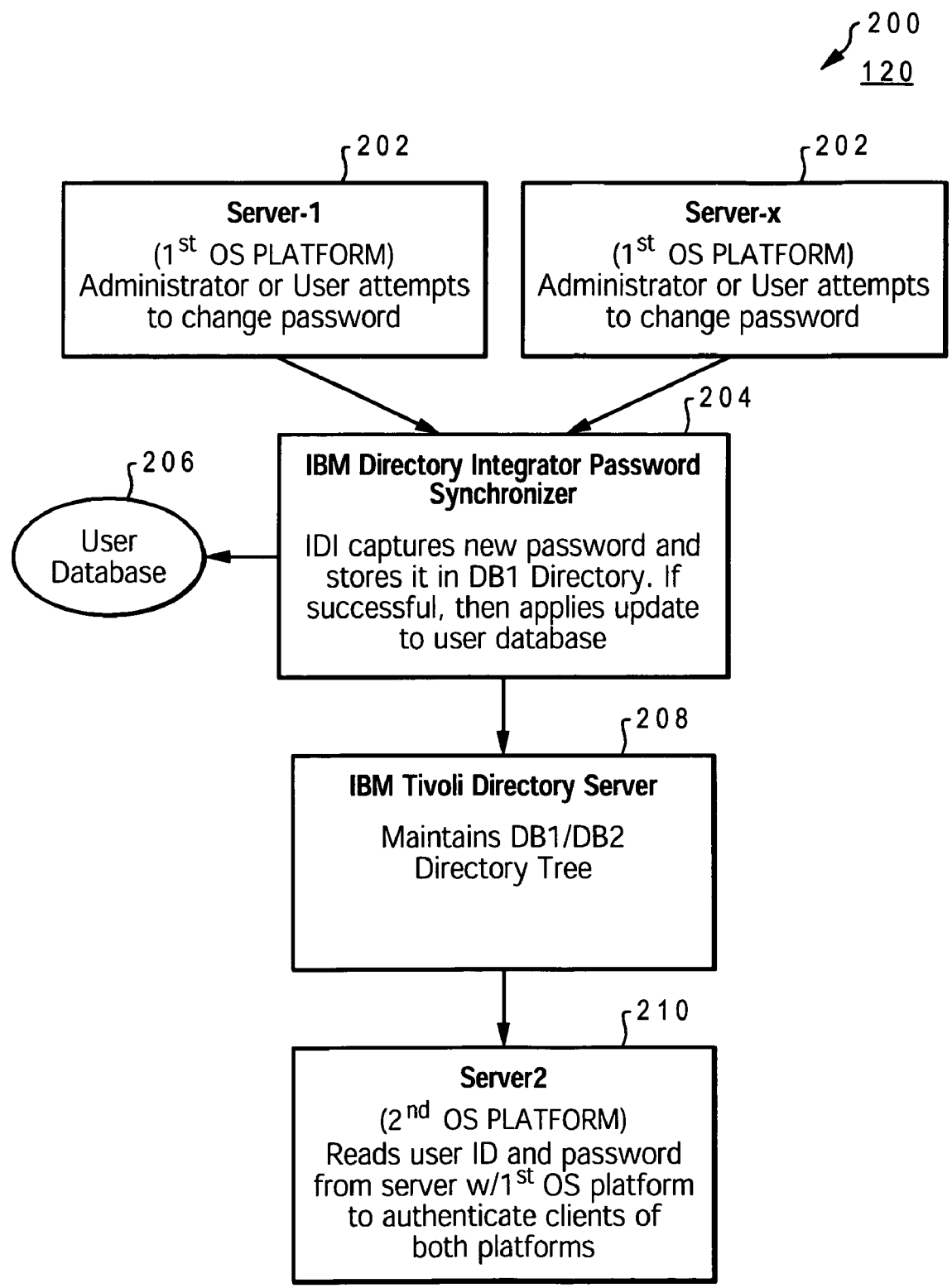
FIG. 2 is a block diagram representation of the flow among various software tools/utilities utilized to carry out synchronization services during migration between operating system platforms, according to one embodiment of the present invention.

FIG. 2 illustrates the functionality associated with relevant ones of the above software utilities/tools and directional flow of the synchronization operation. At the top level of FIG. 2 are two representations of first operating system platform 202 at which an administrator or user enters changes to the user password or other security features, or a new user is registered. Immediately below this level is the directory integrator password synchronizer utility (or DI utility) 204. DI utility 204 captures new passwords provided at any one of first operating system platforms 202, and DI utility 204 stores the new password in the first user database 206, which provides a user authentication database hosted on the first operating system platform(s) 202.

Following the storage of the password in the user database 206, directory server 208 is accessed. Directory server 208 maintains a mapping from a first database 206 to a second database (e.g., a LDAP/Samba directory tree), which is utilized to map data from the first operating system platform 202 to a specific database on a second operating system platform. The specific second operating system platform is determined/found within the directory tree, and the data is passed/forwarded from the first operating system platform 202 to the identified second operating system platform 210. The second operating system platform 210 reads the user ID and password forwarded from first database 206 to authenticate clients of both the first and second operating system platforms within the domain. This allows users/clients to connect either to the new/second operating system platform or the old/first operating system platform using the same user ID and password during the migration process.

Figure 4A:
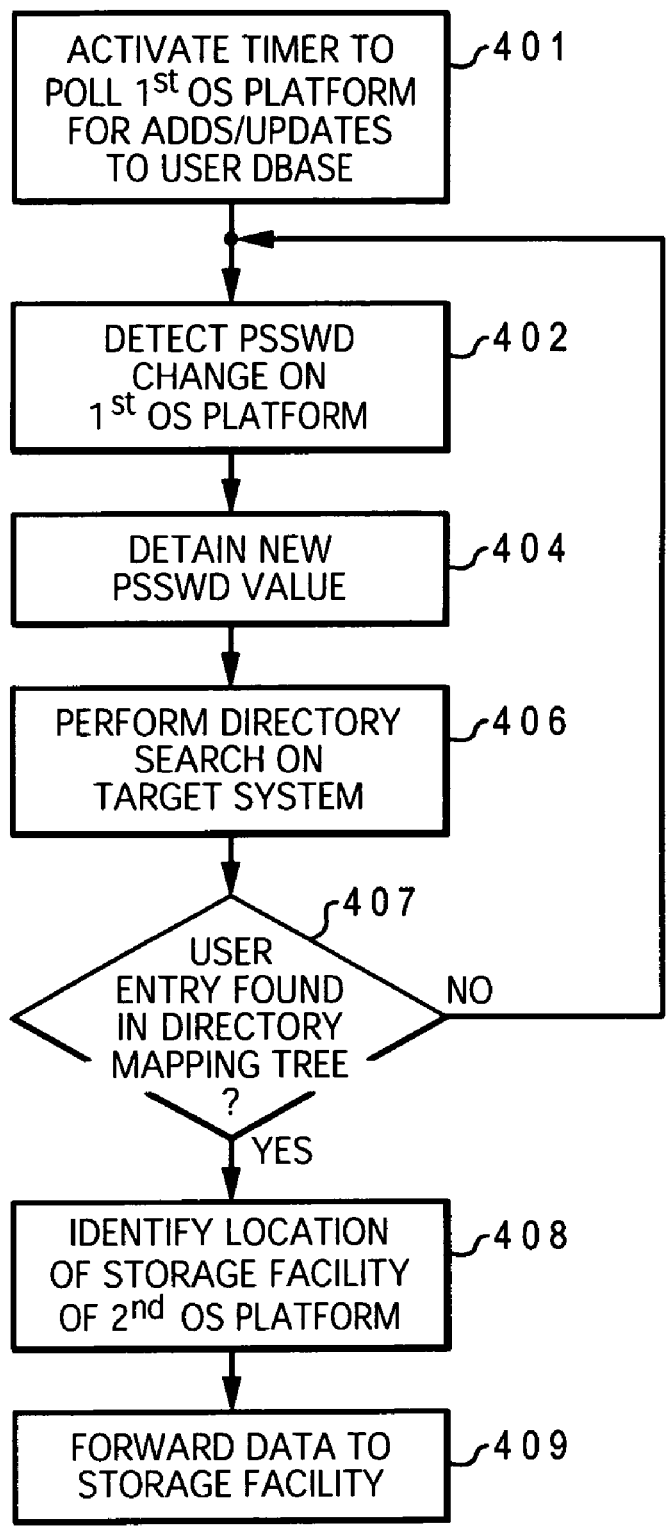
FIGS. 4A and 4B are flow charts illustrating both parts of the process of synchronizing an update to a user password during migration from a first operating system platform to a data storage facility of a second operating system platform, according to one embodiment of the invention.
Figure 4B:
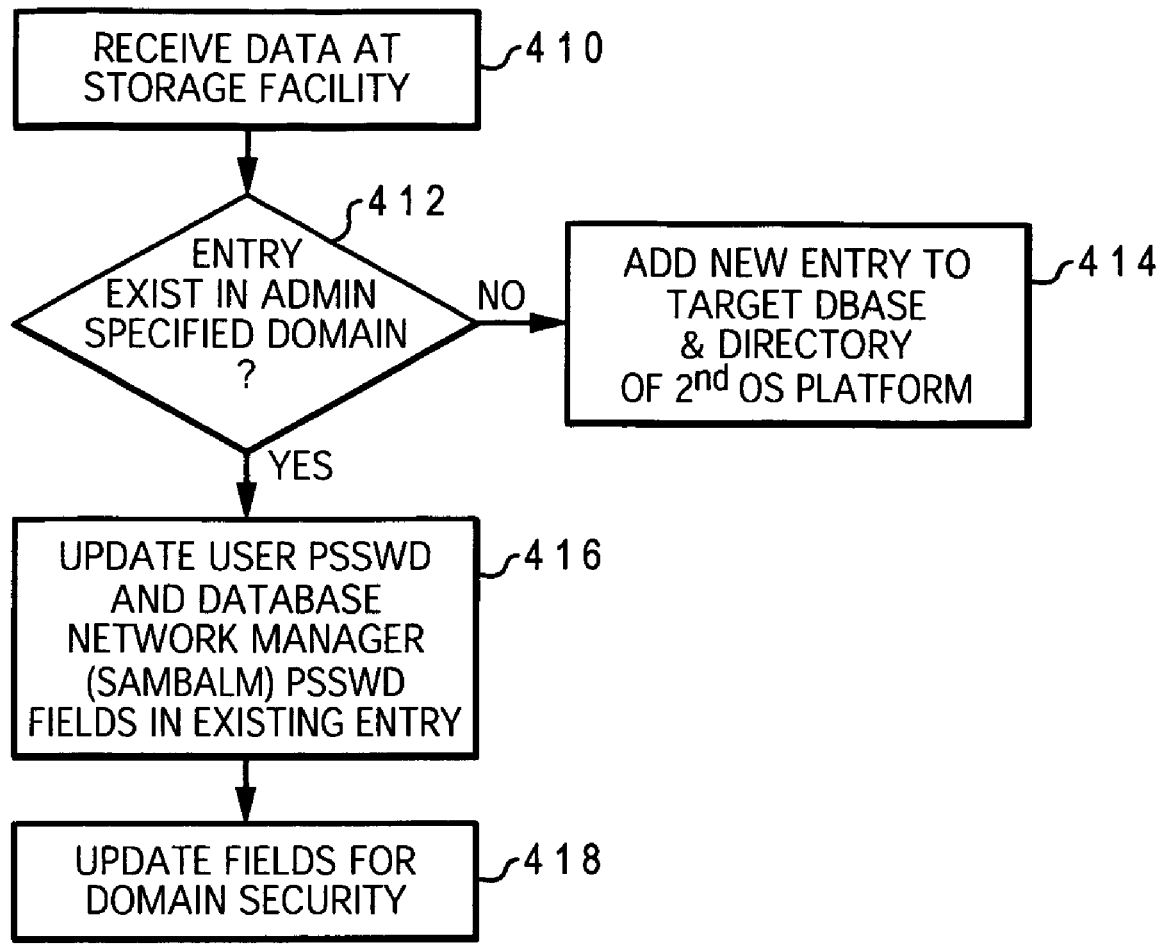

FIG. 4A provides a flow chart illustrating the process by which updates to a user database (e.g., changes to a user password) at a target server with a first operating system (first operating system platform) are captured for synchronization with a second, destination server with a second, different operating system server (second operating system platform). The process begins at block 401 at which a monitoring system is activated to poll the fist operating system platform for additions or updates to the user database (e.g., LDAP). Following, at block 402, an update or change to a password on the target server is detected. The new password value is obtained at block 404, and a search of a directory tree (e.g., LDAP/Samba tree) is performed for the target server at block 406.

In one embodiment, the monitoring system includes a timer and the synchronization function is triggered at pre-set time periods. The timer may be a counter that counts down to 0 or up to N cycles before a synchronization of recorded/detected updates is initiated on the target server's database. Once the synchronization process is initiated, a determination is made at block 407 whether the search of LDAP/Samba tree results in a hit (i.e., a mapping to the destination data storage facility is found within the LDAP directory). Once the search results in a hit, the location (network address or routing parameters) of the data storage facility of the second operating system platform is identified at block 408. Then, the new/updated data (password) is forwarded via the network connection to the destination data storage facility at block 409. Then the process ends until a next user initiated update or a timeout-initiated synchronization process is registered.

As shown by FIG. 4B, data is received at the destination storage facility at block 410. When the data is received, a determination is made at block 412 whether an entry exists for that data in the domain specified by the administrator. If no entry exists, a new entry is added to the data storage facility at block 414. However, when an entry already exists, both the user password and database specific manager password (e.g., Samba LAN Manager password) fields of the entry are updated, as shown at block 416. Following, specific fields may also be updated for domain security as shown at block 418. Then the process ends until a next user password update or security data is received.

According to one illustrative embodiment, the first operating system platform is a Windows operating system platform hosting an LDAP with LDAP/Samba directory tree, while the second operating system platform is a Linux or Unix based operating system platform, with the data storage facility being a Samba/Linux database. Windows is a family of operating systems distributed by Microsoft Corporation, while Linux is an operating system designed by a loose collective of computer engineers. As described previously, Samba is an Open Source/Free Software suite that provides seamless file and print services to SMB/CIFS clients. Samba allows for interoperability between Linux/Unix-based servers and Windows-based clients. More specifically, Samba enables a host (Linux/UNIX) server to operate as if the host server is a Windows "file" and "print" server.

The invention enables efficient migration of security and other user data from one operating system environment to another in a large distributed authentication environment by keeping all critical data in sync between the two operating system environments. Specifically, synchronization of password and user data can be achieved during migration of password data from a first operating system platform to a database of a second operating system platform over a prolonged period of time without disruption of service, while allowing the users to (1) continue accessing the system resources, such as print and file services during the migration and (2) change/update passwords and other profile information.

Regardless of the specific utilities being used to complete the features of the invention, the invention provides a solution to the business problem of migrating a large number of user accounts from one operating system environment to another over a period of time without service interruption. Thus, while the specific migration task described involves migrating user accounts from a database such as LDAP to a Samba storage facility, the technique provided may be utilized on any system with a distributed user account database and a centralized LDAP authentication system.

The solution provided by the invention also allows different systems (running different operating systems) to co-exist over a period of time, thereby reducing the need to rush through the deployment of a new system. Thus, even if migration is not the primary goal, the methods of the invention may still be used to keep two or more disparate systems in sync.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for seamlessly migrating user data from one operating system environment to another, said method comprising:
  detecting a change/update in a parameter associated with an entry in a directory structure of a first operating system platform;
  wherein said detecting a change includes monitoring said first operating system platform for user and administrative inputs during a period in which migration of data from the first operating system platform to the second operating system platform is being completed;
  wherein said directory structure has a pairing of first parameters associated with the first operating system platform and corresponding second parameters associated with the second operating system platform, said second parameters including a network routing parameter for routing data from the first operating system platform to the second operating system platform via a network connecting the two platforms;
  dynamically initiating a search within the first directory structure for the entry to which said parameter is associated;
  when said entry is found, retrieving a network routing parameter for the second operating system platform from within the corresponding second parameters;
  when the entry is not found, retrieving a pre-set network routing parameter established by an administrator at the first operating system platform identifying a network location of a destination operating system platform to which data for new entries established on the first operating system platform is to be forwarded;
  in response retrieving the routing parameter or the pre-set routing parameter:
    creating a synchronization packet having therein the change/update to the parameter; and
    transmitting the synchronization packet to the second operating system platform identified by the routing parameter or pre-set routing parameter;
  automatically forwarding, via a network, the change/update in the parameter to a second operating system platform to update a corresponding entry in a storage device of the second operating system platform;
  programming a pre-established time period at which to trigger said forwarding process; and
  triggering said dynamically initiating, retrieving, and automatically forwarding processes in response to each expiration of the pre-established time period;
  wherein the entry is a user entry and the parameter that is changed is a user password for secure user access to the first operating system platform, said user password having a corresponding user password for access to the second operating system platform;
  wherein the first directory structure is an LDAP directory tree and the first operating system platform is a server within a distributed authentication environment running a Windows operating system; and
  wherein the second operating system platform is a Linux/Unix operating system platform with a Samba storage facility.

* * * * *